United States Patent
Lynam (10) Patent No.: US 12,046,053 B2
(45) Date of Patent: *Jul. 23, 2024

(54) VEHICULAR DRIVER MONITORING SYSTEM

(71) Applicant: Magna Electronics Inc., Auburn Hills, MI (US)

(72) Inventor: Niall R. Lynam, Holland, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,510

(22) Filed: May 8, 2023

(65) Prior Publication Data

US 2023/0274558 A1  Aug. 31, 2023

Related U.S. Application Data

(63) Continuation of application No. 17/645,066, filed on Dec. 20, 2021, now Pat. No. 11,645,856, which is a
(Continued)

(51) Int. Cl.
*G06V 20/59* (2022.01)
*B60W 40/09* (2012.01)
*G06V 40/16* (2022.01)

(52) U.S. Cl.
CPC .......... *G06V 20/597* (2022.01); *B60W 40/09* (2013.01); *G06V 40/166* (2022.01)

(58) Field of Classification Search
CPC .......... G06K 9/00845; G06K 9/00255; B60W 40/09
See application file for complete search history.

(56) References Cited

U.S. PATENT DOCUMENTS 5,550,677 A   8/1996  Schofield et al.
5,567,360 A   10/1996 Varaprasad et al.
(Continued)

FOREIGN PATENT DOCUMENTS

CN   205523966 U   8/2016
CN   209534893 U   10/2019
(Continued)

OTHER PUBLICATIONS

Seeing Machines' FOVIO Driver Monitoring (FDM) processor [description of which is available at https://china.xilinx.com/publications/presentations/c_D3_03-Driver-Monitoring-Systems.pdf], Jan. 14, 2021.

*Primary Examiner* — Santiago Garcia
(74) *Attorney, Agent, or Firm* — HONIGMAN LLP (57) ABSTRACT

A vehicular driver monitoring system includes a driver monitoring camera and an illumination source accommodated within a movable head of an interior rearview mirror of a vehicle. The illumination source is electrically activatable to emit near-infrared (NIR) light that illuminates with near-infrared (NIR) light at least the head of a driver of the vehicle. Emission of near-infrared (NIR) light by the illumination source is modulated on/off at an illumination source modulation rate. The camera frame capture rate of the driver monitoring camera is bigger than the illumination source modulation rate of near-infrared (NIR) light emitted by the illumination source. Frames of image data are captured by the camera and are processed while the illumination source is on and is emitting near-infrared (NIR) light, and frames of image data are captured by the camera and are processed while the illumination source is off and is not emitting near-infrared (NIR) light.

74 Claims, 1 Drawing Sheet

Related U.S. Application Data continuation of application No. 16/836,968, filed on Apr. 1, 2020, now Pat. No. 11,205,083.

(60) Provisional application No. 62/828,128, filed on Apr. 2, 2019.

(56) References Cited

U.S. PATENT DOCUMENTS

| | | |
|---|---|---|
| 5,570,127 A | 10/1996 | Schmidt |
| 5,670,935 A | 9/1997 | Schofield et al. |
| 5,715,093 A | 2/1998 | Schierbeek et al. |
| 5,760,962 A | 6/1998 | Schofield et al. |
| 5,796,094 A | 8/1998 | Schofield et al. |
| 5,877,897 A | 3/1999 | Schofield et al. |
| 6,097,023 A | 8/2000 | Schofield et al. |
| 6,158,655 A | 12/2000 | DeVries, Jr. et al. |
| 6,201,642 B1 | 3/2001 | Bos |
| 6,313,454 B1 | 11/2001 | Bos et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,483,438 B2 | 11/2002 | DeLine et al. |
| 6,498,620 B2 | 12/2002 | Schofield et al. |
| 6,523,964 B2 | 2/2003 | Schofield et al. |
| 6,559,435 B2 | 5/2003 | Schofield et al. |
| 6,590,719 B2 | 7/2003 | Bos |
| 6,593,565 B2 | 7/2003 | Heslin et al. |
| 6,627,918 B2 | 9/2003 | Getz et al. |
| 6,690,268 B2 | 2/2004 | Schofield et al. |
| 6,703,925 B2 | 3/2004 | Steffel |
| 6,717,610 B1 | 4/2004 | Bos et al. |
| 6,757,109 B2 | 6/2004 | Bos |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,922,292 B2 | 7/2005 | Bos |
| 6,946,978 B2 | 9/2005 | Schofield |
| 7,004,606 B2 | 2/2006 | Schofield |
| 7,005,974 B2 | 2/2006 | McMahon et al. |
| 7,038,577 B2 | 5/2006 | Pawlicki et al. |
| 7,123,168 B2 | 10/2006 | Schofield |
| 7,184,190 B2 | 2/2007 | McCabe et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,311,406 B2 | 12/2007 | Schofield et al. |
| 7,338,177 B2 | 3/2008 | Lynam |
| 7,360,932 B2 | 4/2008 | Uken et al. |
| 7,420,756 B2 | 9/2008 | Lynam |
| 7,480,149 B2 | 1/2009 | DeWard et al. |
| 7,626,749 B2 | 12/2009 | Baur et al. |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 7,937,667 B2 | 5/2011 | Kramer et al. |
| 7,965,336 B2 | 6/2011 | Bingle et al. |
| 8,049,640 B2 | 11/2011 | Uken et al. |
| 8,256,821 B2 | 9/2012 | Lawlor et al. |
| 8,258,932 B2 | 9/2012 | Wahlstrom |
| 8,446,470 B2 | 5/2013 | Lu et al. |
| 8,451,107 B2 | 5/2013 | Lu et al. |
| 8,508,831 B2 | 8/2013 | De Wind et al. |
| 8,529,108 B2 | 9/2013 | Uken et al. |
| 8,542,451 B2 | 9/2013 | Lu et al. |
| 8,725,311 B1* | 5/2014 | Breed ..................... A61B 5/11 |
| | | 701/1 |
| 8,730,553 B2 | 5/2014 | De Wind et al. |
| 8,743,203 B2 | 6/2014 | Karner et al. |
| 8,876,342 B2 | 11/2014 | Wimbert et al. |
| 9,041,806 B2 | 5/2015 | Baur et al. |
| 9,090,213 B2 | 7/2015 | Lawlor et al. |
| 9,126,525 B2 | 9/2015 | Lynam et al. |
| 9,174,578 B2 | 11/2015 | Uken et al. |
| 9,346,403 B2 | 5/2016 | Uken et al. |
| 9,405,120 B2 | 8/2016 | Graf et al. |
| 9,487,159 B2 | 11/2016 | Achenbach |
| 9,493,122 B2 | 11/2016 | Krebs |
| 9,596,387 B2 | 3/2017 | Achenbach et al. |
| 9,598,016 B2 | 3/2017 | Blank et al. |
| 9,609,757 B2 | 3/2017 | Steigerwald |
| 9,827,913 B2 | 11/2017 | De Wind et al. |
| 9,871,971 B2 | 1/2018 | Wang et al. |
| 9,878,669 B2 | 1/2018 | Kendall |
| 9,896,039 B2 | 2/2018 | Achenbach et al. |
| 9,900,490 B2 | 2/2018 | Ihlenburg et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,166,926 B2 | 1/2019 | Krebs et al. |
| 10,261,648 B2 | 4/2019 | Uken et al. |
| 10,315,573 B2 | 6/2019 | Bongwald |
| 10,421,404 B2 | 9/2019 | Larson et al. |
| 10,442,360 B2 | 10/2019 | LaCross et al. |
| 10,466,563 B2 | 11/2019 | Kendall et al. |
| 10,567,633 B2 | 2/2020 | Ihlenburg et al. |
| 10,567,705 B2 | 2/2020 | Ziegenspeck et al. |
| 10,703,204 B2 | 7/2020 | Hassan et al. |
| 10,793,067 B2 | 10/2020 | Ihlenburg et al. |
| 10,922,563 B2 | 2/2021 | Nix et al. |
| 10,958,830 B2 | 3/2021 | Koravadi |
| 11,167,771 B2 | 11/2021 | Caron et al. |
| 11,205,083 B2 | 12/2021 | Lynam |
| 11,214,199 B2 | 1/2022 | LaCross et al. |
| 11,240,427 B2 | 2/2022 | Koravadi |
| 11,242,008 B2 | 2/2022 | Blank et al. |
| 11,252,376 B2 | 2/2022 | Ihlenburg |
| 11,341,671 B2 | 5/2022 | Lu et al. |
| 11,348,374 B2 | 5/2022 | Kramer et al. |
| 11,433,906 B2 | 9/2022 | Lu |
| 11,465,561 B2 | 10/2022 | Peterson et al. |
| 11,488,399 B2 | 11/2022 | Wacquant |
| 11,493,918 B2 | 11/2022 | Singh |
| 11,518,401 B2 | 12/2022 | Kulkarni |
| 11,582,425 B2 | 2/2023 | Liu |
| 11,645,856 B2 | 5/2023 | Lynam |
| 2002/0003571 A1* | 1/2002 | Schofield .................. B60R 1/04 |
| | | 348/148 |
| 2002/0005999 A1 | 1/2002 | Hutzel et al. |
| 2003/0209893 A1* | 11/2003 | Breed ............... B60R 21/01554 |
| | | 701/45 |
| 2004/0129478 A1* | 7/2004 | Breed ..................... B60R 22/20 |
| | | 180/273 |
| 2005/0259309 A1* | 11/2005 | Blank .................. B60Q 1/2665 |
| | | 359/267 |
| 2006/0050018 A1 | 3/2006 | Tutzel et al. |
| 2007/0182528 A1 | 8/2007 | Breed et al. |
| 2009/0040778 A1 | 2/2009 | Takayanagi et al. |
| 2009/0244361 A1 | 10/2009 | Gebauer et al. |
| 2010/0020170 A1 | 1/2010 | Higgins-Luthman et al. |
| 2010/0085653 A1 | 4/2010 | Uken et al. |
| 2011/0080481 A1 | 4/2011 | Bellingham |
| 2011/0122049 A1* | 5/2011 | Lvovskiy ............ G02B 27/0101 |
| | | 345/1.3 |
| 2012/0293658 A1* | 11/2012 | Higgins-Luthman ........................ |
| | | B60Q 9/008 |
| | | 348/148 |
| 2013/0016409 A1 | 1/2013 | Kurtz et al. |
| 2013/0044138 A1* | 2/2013 | Koga ..................... G02B 27/01 |
| | | 345/672 |
| 2014/0022390 A1 | 1/2014 | Blank et al. |
| 2014/0118131 A1* | 5/2014 | Chiu ................... B60K 28/066 |
| | | 340/439 |
| 2014/0285666 A1 | 9/2014 | O'Connell et al. |
| 2014/0293169 A1 | 10/2014 | Uken et al. |
| 2014/0313563 A1 | 10/2014 | Uken et al. |

(56) References Cited

U.S. PATENT DOCUMENTS

| | | |
|---|---|---|
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0097955 A1 | 4/2015 | De Wind et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0237946 A1 | 8/2017 | Schofield et al. |
| 2017/0274906 A1 | 9/2017 | Hassan et al. |
| 2017/0355312 A1 | 12/2017 | Habibi et al. |
| 2017/0372143 A1* | 12/2017 | Barcus ............... G06V 20/54 |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2018/0324367 A1* | 11/2018 | Siddiqui ............. H05B 45/12 |
| 2019/0001930 A1* | 1/2019 | Dellock ............... A61L 2/24 |
| 2019/0052792 A1* | 2/2019 | Baba ............... H04N 13/327 |
| 2019/0054899 A1 | 2/2019 | Hoyos et al. |
| 2019/0118717 A1 | 4/2019 | Blank et al. |
| 2019/0146297 A1 | 5/2019 | Lynam et al. |
| 2019/0156134 A1* | 5/2019 | Krishnan ........... G06V 20/597 |
| 2019/0168669 A1 | 6/2019 | Lintz et al. |
| 2019/0258131 A9 | 8/2019 | Lynam et al. |
| 2019/0275945 A1* | 9/2019 | Chang ................ B60R 1/12 |
| 2019/0364199 A1 | 11/2019 | Koravadi |
| 2019/0377933 A1* | 12/2019 | Hara ............... G06V 40/165 |
| 2019/0381938 A1 | 12/2019 | Hopkins |
| 2020/0062168 A1* | 2/2020 | Yuchi ................ B60Q 1/085 |
| 2020/0104571 A1* | 4/2020 | Osuga ............ B60R 21/01538 |
| 2020/0143560 A1 | 5/2020 | Lu et al. |
| 2020/0148098 A1* | 5/2020 | Salter ................ B60Q 1/245 |
| 2020/0148120 A1 | 5/2020 | Englander et al. |
| 2020/0202151 A1 | 6/2020 | Wacquant |
| 2020/0247315 A1* | 8/2020 | Foutis ................ B60Q 1/04 |
| 2020/0320320 A1 | 10/2020 | Lynam |
| 2020/0327323 A1 | 10/2020 | Noble |
| 2020/0377022 A1 | 12/2020 | LaCross et al. |
| 2021/0056306 A1 | 2/2021 | Hu et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0199954 A1* | 7/2021 | Kawasaki ............. H04N 23/71 |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0323473 A1 | 10/2021 | Peterson et al. |
| 2021/0368082 A1 | 11/2021 | Solar |
| 2021/0383104 A1 | 12/2021 | Kramer et al. |
| 2022/0111857 A1 | 4/2022 | Kulkarni |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0131471 A1 | 4/2023 | Sobecki et al. |
| 2023/0137004 A1 | 5/2023 | Huizen et al. |

FOREIGN PATENT DOCUMENTS

| | | |
|---|---|---|
| DE | 10325646 A1 | 1/2004 |
| DE | 102005000650 A1 | 7/2006 |
| FR | 3071788 A1 | 4/2019 |
| WO | 2022150826 A1 | 7/2022 |
| WO | 2023034956 | 3/2023 |

\* cited by examiner

VEHICULAR DRIVER MONITORING SYSTEM

CROSS REFERENCE TO RELATED APPLICATIONS

The present application is a continuation of U.S. patent application Ser. No. 17/645,066, filed Dec. 20, 2021, now U.S. Pat. No. 11,645,856, which is a continuation of U.S. patent application Ser. No. 16/836,968, filed Apr. 1, 2020, now U.S. Pat. No. 11,205,083, which claims the filing benefits of U.S. provisional application Ser. No. 62/828,128, filed Apr. 2, 2019, which is hereby incorporated herein by reference in its entirety.

FIELD OF THE INVENTION

The present invention relates generally to a vision system for a vehicle and, more particularly, to a vehicular vision system that utilizes one or more cameras to monitor attentiveness of the driver of the vehicle.

BACKGROUND OF THE INVENTION

Driver attentiveness is an important element of safe driving, with driver distraction and/or driver fatigue being significant contributors to road accidents and the like. Driver monitoring systems utilizing an in-cabin mounted camera that images the head/face/eyes of the driver to determine driver attentiveness are known. However, such known driver monitoring systems have disadvantages, especially when the driver is driving the vehicle during daylight and on sunny days.

SUMMARY OF THE INVENTION

The present invention provides a driver monitoring system for a vehicle that utilizes one or more cameras to capture image data representative of images interior of the vehicle, and provides an illumination source that emits light that illuminates at least a portion of a driver of the vehicle. The illumination source modulates or codes the emitted light so that the system (via processing of image data captured by the camera) can process image data in accordance with the modulated light to avoid image washout that may otherwise occur in high ambient lighting conditions, such as a sunny day. A control includes an image processor operable to process image data captured by the camera. The camera captures image data representative of the light that is emitted by the illumination source and that reflects off the illuminated portion of the driver of the vehicle. The control, responsive to processing of image data captured by the camera, monitors the illuminated portion of the driver to determine the driver's attentiveness.

The light emitted by the illumination source may be in a near infrared (near IR) spectral region that is invisible to the human eye, and that is outside the visible spectral region present in insolation (solar radiation at a given area) and that is at a wavelength within the sensitivity of the camera. The camera may comprise a CMOS imaging array sensor (comprising multiple rows and columns of photosensing elements) that is sensitive within the near infrared spectral region.

Because the intensity of light emitted by the illumination source that is incident at the imaging sensor of the camera is modulated at the frequency of light emitted modulation of the light emitter, electronic analysis/filtering of the signal output of the imaging sensor of the camera can be used to distinguish the information of interest (i.e., the episodically illuminated driver's head region) from ambient lighting/sunlight directly impinging on the imaging sensor (that is not modulated as is the light emitted by the illumination source). The present invention is particularly advantageous in distinguishing the information of interest from ambient lighting when sunlight is streaming through side windows of the vehicle or through a rear window of the vehicle so as to be directly incident on the imaging array that views into the vehicle cabin towards the driver's head region.

These and other objects, advantages, purposes and features of the present invention will become apparent upon review of the following specification in conjunction with the drawings.

DESCRIPTION OF THE PREFERRED EMBODIMENTS

Figure 1:
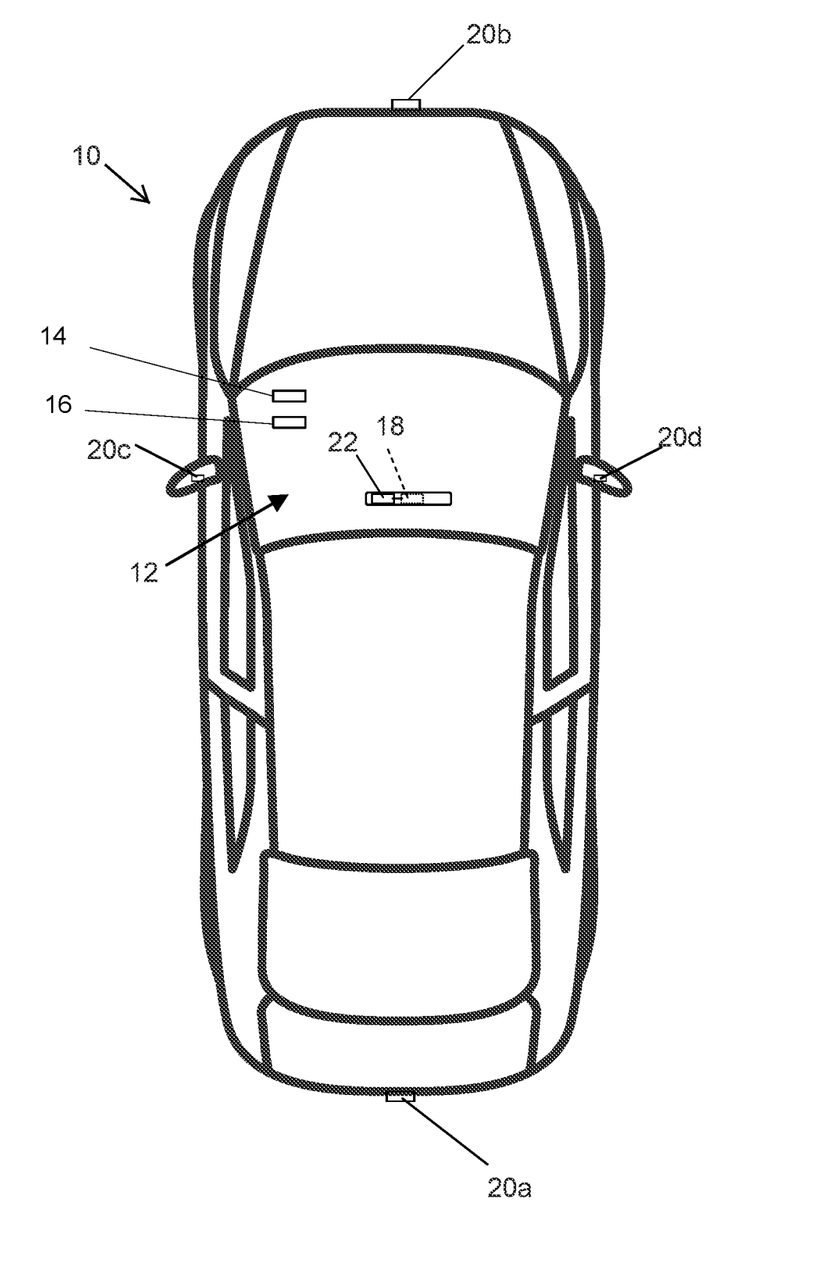
FIG. 1 is a plan view of a vehicle with a driver monitoring system that incorporates a camera and light source in accordance with the present invention.

Referring now to the drawings and the illustrative embodiments depicted therein, a vehicle 10 includes an imaging system or vision system 12 that includes at least one interior or driver monitoring camera 14 and a light source or illumination source 16 (FIG. 1). Illumination source 16 [which may be an array of individual light emitters, such as an array of a plurality of light emitting diodes (LEDs) that preferably are near-IR light emitting diodes (NIR LEDs)] is positioned and oriented in the interior cabin of the equipped vehicle so as to illuminate at least the front head region of the driver of the equipped vehicle. The vision system 12 includes a control (that comprises a processor) or electronic control unit (ECU) 18 that includes electronic circuitry and associated software, with the electronic circuitry comprising a processor that is operable to process image data captured by the camera to determine attentiveness of the driver of the vehicle. The data transfer or signal communication from the camera to the ECU may comprise any suitable data or communication link, such as a vehicle network bus or the like of the equipped vehicle. The illumination source may be light-intensity modulated or controlled such that light emitted by the illumination source has a modulated intensity to illuminate the driver's head region with a modulated light intensity having a characteristic modulation signature.

The camera has an imaging array sensor (comprising multiple rows and columns of photosensing elements) that is sensitive to at least the spectral region of the light emitted by the illumination source. The ECU may electronically or digitally filter the output signal of the imaging array sensor of the camera to distinguish the component of that output arising from the light-intensity modulated illuminated driver's head (as illuminated by the illumination source when modulated) from the component of the output signal of the imaging array sensor due to illumination of the driver's head by ambient lighting (typically sunlight streaming into the interior cabin such as though the windows of the quipped vehicle, and especially through side windows and/or the rear window). By syncing the camera frame capture rate with the intensity modulation rate of the illumination source, the system can compare illuminated frames of image data with non-illuminated frames of image data to provide enhanced processing and to avoid image washout issues in bright sunlight conditions.

For example, the camera may capture frames of image data at 60 frames per second and the illumination source may be modulated so that it is at its high intensity 30 times per second (and thus at its low intensity 30 times per second), whereby every other frame of image data captured by the camera is of the illuminated driver's head region. The system compares the frames of image data captured when the illumination source is activated to the frames of image data captured when the illumination source is not activated to determine the component of the captured image data that is due to the illumination source and the component of the captured image data that is due to ambient light, and the system may then filter the output signal or adjust the camera settings to reduce or remove the component of the captured image data that is due to ambient light, so as to avoid washout during bright lighting conditions.

The driver monitoring camera 14 captures image data representative of the driver's head. The interior cabin-viewing camera may be disposed at any suitable location in interior cabin of the vehicle, such as at a dashboard or instrument panel of the vehicle or within the movable head of an interior rearview mirror or part of a windshield electronics module (that includes a forward-viewing camera for advanced driver assistance functions such as described in U.S. Pat. Nos. 9,896,039; 9,871,971; 9,596,387; 8,256,821; 7,480,149; 6,824,281 and/or 6,690,268, which are all hereby incorporated herein by reference in their entireties) with the field of view of the cabin-viewing camera encompassing the driver head region in the vehicle (either directly or via a reflector). The light source 16 is operable to illuminate the driver front head region in a manner that enhances capturing and processing of image data in high ambient lighting conditions, as discussed below.

Driver monitoring systems may be used to track the head and eyes of the driver of a vehicle. To accurately track the eyes of the driver, the pupils of the eyes must be clearly viewed by a camera or other imaging device. Because of this, a preferred camera position is directly in front of the driver and at or below a line-of-sight to the road. This allows the camera to view both pupils in most situations and also avoid having the driver's eyelashes in the way (which is a problem that occurs when cameras are mounted above the line-of-sight to the road). In high ambient lighting conditions, image washout is a concern and the system may not be as capable of detecting the slight changes and differences in the driver's gaze or attentiveness.

The driver monitoring system of the present invention uses an additional light source 16 that modulates (e.g., modulates the intensity of or encodes a modulation signal on) the light that is emitted by the light source to illuminate the driver's face. The camera senses that light and the image processor processes image data captured by the camera when sensing that light and when not sensing that light and/or to distinguish light having a characteristic light modulation signature to provide enhanced sensing capabilities to monitor the driver's head and eyes. The system then can subtract out or filter out the images to remove the high ambient light component of the captured image data so that the image data is not washed out on a sunny day or other high ambient lighting conditions.

The light source 16 may emit visible and/or non-visible (e.g., infrared or near-infrared) light, and may comprise a light emitting diode (LED) or other light source disposed in the vehicle that emits the light toward the driver's head region, whereby the camera images the illuminated driver's head. The LED and camera may operate together when the driver monitoring system is operating. The LED may be disposed at the camera or the LED may be disposed elsewhere in the vehicle and emit light generally directly toward the driver's head region.

The light source may emit visible and/or non-visible light. During daytime lighting conditions, it does not matter if the driver's head is illuminated with extra visible light, since the driver will not typically notice that due to the sunlight present. During nighttime lighting conditions, the potential image washout due to the sun is less of a concern.

Sunlight comprises substantial amount of visible, UV and IR/near IR radiation. On average, most of the solar energy is between 300 nm and 2,100 nm, while Ultraviolet (UV) radiation constitutes around 3 percent of solar radiation (up to 400 nm), visible light or radiation constitutes around 48 percent (between 400 nm and 700 nm), and infrared (IR) light or radiation constitutes around 49 percent. NIR LEDs with wavelengths 770 nm or 870 nm or 880 nm or 940 nm or 950 nm are available from the likes of Excelitas Technologies with a place of business in Waltham, Massachusetts, and pulsed semiconductor lasers in the near IR (NIR) are also available from the likes of Excelitas Technologies, which offers a wide range of pulsed 905 nm lasers including monolithic layered structures with up to 4 active areas per chip, resulting in up to 100 Watts of peak output power.

The system of the present invention modulates the light emitted by the light source, such as by modulating the intensity of the light emitted by the light source. For example, the light source may emit a particular spectral band of light (such as IR or near IR light) or may emit visible light covering a wide spectral band, and the light source may be pulsed or modulated to turn on/off the emitted light and/or increase/decrease the intensity of the emitted light. The light source may comprise a white light-emitting LED or a red light-emitting LED or the like, and may be modulated during daytime lighting conditions, whereby the driver's head is illuminated with the additional light. In bright sunlight, the white light-emitted LED may be dominated by the sunlight, so the system may reduce the light sensitivity of the camera to a level where the image washout is reduced. For example, when the ambient light level is high (such as greater than, for example, 10,000 lux), then the system may reduce the sensitivity of the camera and/or may increase the intensity of the peak illumination levels of the white light-emitting LED.

Optionally, the light emitted by the illumination source may be in a near infrared (near IR) spectral region that is invisible to the human eye, and that is outside the visible spectral region present in insolation (solar radiation at a given area) and that is at a wavelength within the spectral sensitivity of the camera. Because the intensity of light emitted by the illumination source that is incident at the imaging sensor of the camera is modulated, electronic analysis/processing/filtering of the signal output of the imaging sensor of the camera can be used to distinguish the information of interest (i.e., the light-modulated illuminated driver's head region) from ambient lighting/sunlight that is or may be directly impinging on the imaging sensor (and that is not modulated by the control or system). Thus, the system can process and compare the frames of image data (illuminated and non-illuminated) to determine differences and to filter out the direct sunlight effects to provide enhanced sensing and monitoring of the driver's head and eyes. The present invention is particularly advantageous in distinguishing the information of interest from ambient lighting when sunlight is streaming through side windows of the vehicle or through a rear window of the vehicle so as to be directly incident on the imaging array that views into the vehicle cabin towards the driver's head region.

Thus, the system uses a light emitting illumination source (that modulates the light emitted thereby) and a camera to monitor, for example, the head and/or eyes of a driver of a vehicle. Using the selected modulation of the light source, the system processes image data captured by the camera to detect and monitor the driver's head illuminated by the modulated light. The system may, for example, determine the general viewing direction of the driver, the focal distance of the driver's gaze, or alertness of the driver.

The driver monitoring system may utilize aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. No. 7,311,406 and/or 6,523,964, and/or U.S. Publication Nos. US-2017-0274906; US-2016-0137126; US-2015-0352953; US-2015-0296135; US-2015-0294169; US-2015-0232030; US-2015-0022664; US-2015-0015710; US-2015-0009010 and/or US-2014-0336876, and/or U.S. patent application Ser. No. 16/718,860, filed Dec. 18, 2019 and published Jun. 25, 2020 as U.S. Publication No. US-2020-0202151, and/or Ser. No. 16/668,035, filed Oct. 30, 2019 and published May 7, 2020 as U.S. Publication No. US-2020-0143560, which are all hereby incorporated herein by reference in their entireties.

The vehicle or vision system may include at least one exterior viewing imaging sensor or camera, such as a rearward viewing imaging sensor or camera 20a (and the system may optionally include multiple exterior viewing imaging sensors or cameras, such as a forward viewing camera 20b at the front (or at the windshield) of the vehicle, and a sideward/rearward viewing camera 20c, 20d at respective sides of the vehicle), which captures images exterior of the vehicle, with the camera having a lens for focusing images at or onto an imaging array or imaging plane or imager of the camera (FIG. 1). For example, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). A display 22 in the vehicle may display video images derived from or representative of image data captured by the cameras.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US-2010-0020170 and/or US-2009-0244361, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:

a driver monitoring camera and an illumination source disposed within an interior cabin of a vehicle equipped with the vehicular driver monitoring system;

wherein an interior rearview mirror assembly is attached at a portion of the interior cabin of the equipped vehicle;

wherein the interior rearview mirror assembly comprises a movable head that accommodates an interior mirror reflective element;

wherein the driver monitoring camera is accommodated within the movable head of the interior rearview mirror assembly that is attached at the portion of the interior cabin of the equipped vehicle;

wherein the driver monitoring camera accommodated within the movable head of the interior rearview mirror assembly comprises a CMOS imaging array sensor operable to capture frames of image data at a camera frame capture rate;

wherein the CMOS imaging array sensor comprises multiple rows and columns of photosensor elements that are photosensitive within the visible light spectral region and that are photosensitive within the near-infrared (NIR) light spectral region;

wherein the illumination source is electrically activatable to emit near-infrared (NIR) light that, with the interior rearview mirror assembly attached at the portion of the interior cabin of the equipped vehicle, illuminates with near-infrared (NIR) light at least the head of a driver of the equipped vehicle when activated to emit near-infrared (NIR) light;

wherein emission of near-infrared (NIR) light by the illumination source is modulated on/off at an illumination source modulation rate;

wherein the camera frame capture rate of the driver monitoring camera is bigger than the illumination source modulation rate of near-infrared (NIR) light emitted by the illumination source;

wherein, with the interior rearview mirror assembly attached at the portion of the interior cabin of the equipped vehicle, the driver monitoring camera accommodated within the movable head of the interior rearview mirror assembly views at least the head of the driver of the equipped vehicle;

an image processor operable to process image data captured by the CMOS imaging array sensor of the driver monitoring camera;

wherein near-infrared (NIR) light emitted by the illumination source that is reflected off at least the head of the driver of the equipped vehicle is incident at the CMOS imaging array sensor of the driver monitoring camera; and wherein (i) frames of image data are captured by the driver monitoring camera and are processed at the image processor while the illumination source is on and is emitting near-infrared (NIR) light that illuminates at least the head of the driver of the equipped vehicle and (ii) frames of image data are captured by the driver monitoring camera and are processed at the image processor while the illumination source is off and is not emitting near-infrared (NIR) light to illuminate at least the head of the driver of the equipped vehicle.

2. The vehicular driver monitoring system of claim 1, wherein the camera frame capture rate is 60 frames per second.

3. The vehicular driver monitoring system of claim 2, wherein the illumination source modulation rate is 30 times per second.

4. The vehicular driver monitoring system of claim 2, wherein, with the interior rearview mirror assembly attached at the portion of the interior cabin of the equipped vehicle, the driver monitoring camera accommodated within the movable head of the interior rearview mirror assembly is disposed behind the interior mirror reflective element and views through the interior mirror reflective element into the interior cabin of the equipped vehicle, and wherein the image processor operable to process image data captured by the driver monitoring camera is accommodated within the movable head of the interior rearview mirror assembly.

5. The vehicular driver monitoring system of claim 1, wherein the illumination source comprises at least one near-infrared (NIR) light emitting diode.

6. The vehicular driver monitoring system of claim 1, wherein the illumination source comprises a plurality of near-infrared (NIR) light emitting diodes.

7. The vehicular driver monitoring system of claim 1, wherein the illumination source comprises at least one near-infrared (NIR) laser.

8. The vehicular driver monitoring system of claim 1, wherein the illumination source comprises a plurality of near-infrared (NIR) lasers.

9. The vehicular driver monitoring system of claim 1, wherein the illumination source comprises a plurality of near-infrared (NIR) lasers arranged in an array of near-infrared (NIR) lasers.

10. The vehicular driver monitoring system of claim 1, wherein the illumination source, when electrically activated, emits near-infrared (NIR) light having wavelength of 770 nm.

11. The vehicular driver monitoring system of claim 1, wherein the illumination source, when electrically activated, emits near-infrared (NIR) light having wavelength of 870 nm.

12. The vehicular driver monitoring system of claim 1, wherein the illumination source, when electrically activated, emits near-infrared (NIR) light having wavelength of 890 nm.

13. The vehicular driver monitoring system of claim 1, wherein the illumination source, when electrically activated, emits near-infrared (NIR) light having wavelength of 940 nm.

14. The vehicular driver monitoring system of claim 1, wherein the illumination source, when electrically activated, emits near-infrared (NIR) light having wavelength of 950 nm.

15. The vehicular driver monitoring system of claim 1, wherein the camera frame capture rate of the driver monitoring camera is twice the illumination source modulation rate of near-infrared (NIR) light emitted by the illumination source.

16. The vehicular driver monitoring system of claim 1, wherein the driver monitoring camera views the eyes of the driver of the equipped vehicle.

17. The vehicular driver monitoring system of claim 16, wherein, via processing of captured image data at the image processor, the eyes of the driver of the equipped vehicle are tracked.

18. The vehicular driver monitoring system of claim 17, wherein, via processing of captured image data at the image processor, focal distance of gaze by the driver of the equipped vehicle is determined.

19. The vehicular driver monitoring system of claim 1, wherein, via processing of captured image data at the image processor, where the face of the driver of the equipped vehicle is directed is tracked.

20. The vehicular driver monitoring system of claim 1, wherein, via processing of captured image data at the image processor, position of the head of the driver of the equipped vehicle is tracked.

21. The vehicular driver monitoring system of claim 1, wherein the driver monitoring camera views the pupils of the eyes of the driver of the equipped vehicle.

22. The vehicular driver monitoring system of claim 1, wherein the illumination source comprises a plurality of near-infrared (NIR) light emitting diodes arranged in an array of near-infrared (NIR) light emitting diodes.

23. The vehicular driver monitoring system of claim 1, wherein, via processing of captured image data at the image processor, attentiveness of the driver of the equipped vehicle is determined.

24. The vehicular driver monitoring system of claim 23, wherein the portion of the interior cabin of the equipped vehicle at which the interior rearview mirror assembly is attached comprises an in-cabin side of a front windshield of the equipped vehicle.

25. The vehicular driver monitoring system of claim 1, wherein the driver monitoring camera is accommodated within the movable head of the interior rearview mirror assembly behind the interior mirror reflective element.

26. The vehicular driver monitoring system of claim 25, wherein the illumination source is accommodated within the movable head of the interior rearview mirror assembly.

27. The vehicular driver monitoring system of claim 26, wherein the image processor operable to process image data captured by the driver monitoring camera is accommodated within the movable head of the interior rearview mirror assembly.

28. The vehicular driver monitoring system of claim 26, wherein, with the interior rearview mirror assembly attached at the portion of the interior cabin of the equipped vehicle, the driver monitoring camera accommodated within the movable head of the interior rearview mirror assembly that is disposed behind the interior mirror reflective element views through the interior mirror reflective element into the interior cabin of the equipped vehicle.

29. A vehicular driver monitoring system, the vehicular driver monitoring system comprising:

a driver monitoring camera and an illumination source disposed within an interior cabin of a vehicle equipped with the vehicular driver monitoring system;

wherein an interior rearview mirror assembly is attached at an in-cabin side of a front windshield of the equipped vehicle;

wherein the interior rearview mirror assembly comprises a movable head that accommodates an interior mirror reflective element;

wherein the driver monitoring camera and the illumination source are accommodated within the movable head of the interior rearview mirror assembly that is attached the in-cabin side of the front windshield of the equipped vehicle;

wherein the driver monitoring camera accommodated within the movable head of the interior rearview mirror assembly comprises a CMOS imaging array sensor operable to capture frames of image data at a camera frame capture rate;

wherein the CMOS imaging array sensor comprises multiple rows and columns of photosensor elements that are photosensitive within the visible light spectral region and that are photosensitive within the near-infrared (NIR) light spectral region;

wherein the illumination source is electrically activatable to emit near-infrared (NIR) light that, with the interior rearview mirror assembly attached at the in-cabin side of the front windshield of the equipped vehicle, illuminates with near-infrared (NIR) light at least the head of a driver of the equipped vehicle when activated to emit near-infrared (NIR) light;

wherein the illumination source comprises at least one near-infrared (NIR) light emitting diode;

wherein emission of near-infrared (NIR) light by the illumination source is modulated on/off at an illumination source modulation rate;

wherein the camera frame capture rate of the driver monitoring camera is bigger than the illumination source modulation rate of near-infrared (NIR) light emitted by the illumination source;

wherein, with the interior rearview mirror assembly attached at the in-cabin side of the front windshield of the equipped vehicle, the driver monitoring camera accommodated within the movable head of the interior rearview mirror assembly views at least the head of the driver of the equipped vehicle an image processor operable to process image data captured by the CMOS imaging array sensor of the driver monitoring camera;

wherein near-infrared (NIR) light emitted by the illumination source that is reflected off at least the head of the driver of the equipped vehicle is incident at the CMOS imaging array sensor of the driver monitoring camera; and wherein (i) frames of image data are captured by the driver monitoring camera and are processed at the image processor while the illumination source is on and is emitting near-infrared (NIR) light that illuminates at least the head of the driver of the equipped vehicle and (ii) frames of image data are captured by the driver monitoring camera and are processed at the image processor while the illumination source is off and is not emitting near-infrared (NIR) light to illuminate at least the head of the driver of the equipped vehicle.

30. The vehicular driver monitoring system of claim 29, wherein the illumination source comprises a plurality of near-infrared (NIR) light emitting diodes.

31. The vehicular driver monitoring system of claim 30, wherein the camera frame capture rate is 60 frames per second.

32. The vehicular driver monitoring system of claim 31, wherein the illumination source modulation rate is 30 times per second.

33. The vehicular driver monitoring system of claim 31, wherein the illumination source, when electrically activated, emits near-infrared (NIR) light having wavelength of 770 nm.

34. The vehicular driver monitoring system of claim 31, wherein the illumination source, when electrically activated, emits near-infrared (NIR) light having wavelength of 870 nm.

35. The vehicular driver monitoring system of claim 31, wherein the illumination source, when electrically activated, emits near-infrared (NIR) light having wavelength of 890 nm.

36. The vehicular driver monitoring system of claim 31, wherein the illumination source, when electrically activated, emits near-infrared (NIR) light having wavelength of 940 nm.

37. The vehicular driver monitoring system of claim 31, wherein the illumination source, when electrically activated, emits near-infrared (NIR) light having wavelength of 950 nm.

38. The vehicular driver monitoring system of claim 31, wherein, via processing of captured image data at the image processor, focal distance of gaze by the driver of the equipped vehicle is determined.

39. The vehicular driver monitoring system of claim 31, wherein, via processing of captured image data at the image processor, where the face of the driver of the equipped vehicle is directed is tracked.

40. The vehicular driver monitoring system of claim 31, wherein, via processing of captured image data at the image processor, position of the head of the driver of the equipped vehicle is tracked.

41. The vehicular driver monitoring system of claim 31, wherein the driver monitoring camera is accommodated within the movable head of the interior rearview mirror assembly behind the interior mirror reflective element.

42. The vehicular driver monitoring system of claim 41, wherein the illumination source is accommodated within the movable head of the interior rearview mirror assembly.

43. The vehicular driver monitoring system of claim 41, wherein the image processor operable to process image data captured by the driver monitoring camera is accommodated within the movable head of the interior rearview mirror assembly.

44. The vehicular driver monitoring system of claim 41, wherein, with the interior rearview mirror assembly attached at the in-cabin side of the front windshield of the equipped vehicle, the driver monitoring camera accommodated within the movable head of the interior rearview mirror assembly that is disposed behind the interior mirror reflective element views through the interior mirror reflective element into the interior cabin of the equipped vehicle.

45. The vehicular driver monitoring system of claim 31, wherein the illumination source comprises a plurality of near-infrared (NIR) light emitting diodes arranged in an array of near-infrared (NIR) light emitting diodes.

46. The vehicular driver monitoring system of claim 45, wherein, via processing of captured image data at the image processor, attentiveness of the driver of the equipped vehicle is determined.

47. The vehicular driver monitoring system of claim 30, wherein the driver monitoring camera views the eyes of the driver of the equipped vehicle.

48. The vehicular driver monitoring system of claim 47, wherein, via processing of captured image data at the image processor, the eyes of the driver of the equipped vehicle are tracked.

49. The vehicular driver monitoring system of claim 29, wherein the camera frame capture rate of the driver monitoring camera is twice the illumination source modulation rate of near-infrared (NIR) light emitted by the illumination source.

50. A vehicular driver monitoring system, the vehicular driver monitoring system comprising:
   a driver monitoring camera and an illumination source disposed within an interior cabin of a vehicle equipped with the vehicular driver monitoring system;
   wherein an interior rearview mirror assembly is attached at an in-cabin side of a front windshield of the equipped vehicle;
   wherein the interior rearview mirror assembly comprises a movable head that accommodates an interior mirror reflective element;
   wherein the driver monitoring camera and the illumination source are accommodated within the movable head of the interior rearview mirror assembly that is attached the in-cabin side of the front windshield of the equipped vehicle;
   wherein the driver monitoring camera accommodated within the movable head of the interior rearview mirror assembly comprises a CMOS imaging array sensor operable to capture frames of image data at a camera frame capture rate;
   wherein the CMOS imaging array sensor comprises multiple rows and columns of photosensor elements that are photosensitive within the visible light spectral region and that are photosensitive within the near-infrared (NIR) light spectral region;
   wherein the illumination source accommodated within the movable head of the interior rearview mirror assembly is electrically activatable to emit near-infrared (NIR) light that, with the interior rearview mirror assembly attached at the in-cabin side of the front windshield of the equipped vehicle, illuminates with near-infrared (NIR) light at least the head of a driver of the equipped vehicle when activated on to emit near-infrared (NIR) light;
   wherein the illumination source comprises at least one near-infrared (NIR) light emitting diode;
   wherein, with the interior rearview mirror assembly attached at the in-cabin side of the front windshield of the equipped vehicle, the driver monitoring camera accommodated within the movable head of the interior rearview mirror assembly views at least the head of the driver of the equipped vehicle;
   wherein emission of near-infrared (NIR) light by the illumination source is modulated on/off at an illumination source modulation rate;
   wherein the camera frame capture rate of the driver monitoring camera is bigger than the illumination source modulation rate of near-infrared (NIR) light emitted by the illumination source;
   an image processor operable to process image data captured by the CMOS imaging array sensor of the driver monitoring camera;
   wherein near-infrared (NIR) light emitted by the illumination source that is reflected off at least the head of the driver of the equipped vehicle is incident at the CMOS imaging array sensor of the driver monitoring camera;
   wherein at least one selected from the group consisting of (i) the driver monitoring camera views the eyes of the driver of the equipped vehicle, (ii) via processing of captured image data at the image processor, the eyes of the driver of the equipped vehicle are tracked, (iii) via processing of captured image data at the image processor, focal distance of gaze by the driver of the equipped vehicle is determined, (iv) via processing of captured image data at the image processor, where the face of the driver of the equipped vehicle is directed is tracked, (v) via processing of captured image data at the image processor, where the face of the driver of the equipped vehicle is directed is tracked, (vi) via processing of captured image data at the image processor, position of the head of the driver of the equipped vehicle is tracked and (vii) the driver monitoring camera views the pupils of the eyes of the driver of the equipped vehicle; and
   wherein, via processing of captured image data at the image processor, attentiveness of the driver of the equipped vehicle is determined.

51. The vehicular driver monitoring system of claim 50, wherein the illumination source comprises a plurality of near-infrared (NIR) light emitting diodes arranged in an array of near-infrared (NIR) light emitting diodes.

52. The vehicular driver monitoring system of claim 50, wherein the illumination source comprises a plurality of near-infrared (NIR) light emitting diodes.

53. The vehicular driver monitoring system of claim 52, wherein the driver monitoring camera views the eyes of the driver of the equipped vehicle.

54. The vehicular driver monitoring system of claim 53, wherein, via processing of captured image data at the image processor, the eyes of the driver of the equipped vehicle are tracked.

55. The vehicular driver monitoring system of claim 52, wherein, via processing of captured image data at the image processor, focal distance of gaze by the driver of the equipped vehicle is determined.

56. The vehicular driver monitoring system of claim 52, wherein, via processing of captured image data at the image processor, where the face of the driver of the equipped vehicle is directed is tracked.

57. The vehicular driver monitoring system of claim 52, wherein, via processing of captured image data at the image processor, position of the head of the driver of the equipped vehicle is tracked.

58. The vehicular driver monitoring system of claim 52, wherein the driver monitoring camera views the pupils of the eyes of the driver of the equipped vehicle.

59. The vehicular driver monitoring system of claim 52, wherein the camera frame capture rate is 60 frames per second.

60. The vehicular driver monitoring system of claim 52, wherein the illumination source modulation rate is 30 times per second.

61. The vehicular driver monitoring system of claim 52, wherein the illumination source, when electrically activated, emits near-infrared (NIR) light having wavelength of 940 nm.

62. The vehicular driver monitoring system of claim 52, wherein the camera frame capture rate of the driver monitoring camera is twice the illumination source modulation rate of near-infrared (NIR) light emitted by the illumination source.

63. The vehicular driver monitoring system of claim 52, wherein the image processor operable to process image data captured by the driver monitoring camera is accommodated within the movable head of the interior rearview mirror assembly.

64. The vehicular driver monitoring system of claim 63, wherein, with the interior rearview mirror assembly attached at the in-cabin side of the front windshield of the equipped vehicle, the driver monitoring camera accommodated within the movable head of the interior rearview mirror assembly behind the interior mirror reflective element views through the interior mirror reflective element into the interior cabin of the equipped vehicle.

65. The vehicular driver monitoring system of claim 64, wherein the image processor operable to process image data captured by the driver monitoring camera is accommodated within the movable head of the interior rearview mirror assembly.

66. The vehicular driver monitoring system of claim 50, wherein the driver monitoring camera is accommodated within the movable head of the interior rearview mirror assembly behind the interior mirror reflective element.

67. A vehicular driver monitoring system, the vehicular driver monitoring system comprising:
- a driver monitoring camera and an illumination source disposed within an interior cabin of a vehicle equipped with the vehicular driver monitoring system;
- wherein an interior rearview mirror assembly is attached at an in-cabin side of a front windshield of the equipped vehicle;
- wherein the interior rearview mirror assembly comprises a movable head that accommodates an interior mirror reflective element;
- wherein the illumination source is accommodated within the movable head of the interior rearview mirror assembly that is attached the in-cabin side of the front windshield of the equipped vehicle;
- wherein the driver monitoring camera is accommodated within the movable head of the interior rearview mirror assembly behind the interior mirror reflective element;
- wherein the driver monitoring camera accommodated within the movable head of the interior rearview mirror assembly comprises a CMOS imaging array sensor operable to capture frames of image data at a camera frame capture rate;
- wherein the camera frame capture rate is 60 frames per second;
- wherein the CMOS imaging array sensor comprises multiple rows and columns of photosensor elements that are photosensitive within the visible light spectral region and that are photosensitive within the near-infrared (NIR) light spectral region;
- wherein, with the interior rearview mirror assembly attached at the in-cabin side of the front windshield of the equipped vehicle, the driver monitoring camera accommodated within the movable head of the interior rearview mirror assembly behind the interior mirror reflective element views through the interior mirror reflective element into the interior cabin of the equipped vehicle;
- wherein the illumination source accommodated within the movable head of the interior rearview mirror assembly is electrically activatable to emit near-infrared (NIR) light that, with the interior rearview mirror assembly attached at the in-cabin side of the front windshield of the equipped vehicle, illuminates with near-infrared (NIR) light at least the head of a driver of the equipped vehicle when activated to emit near-infrared (NIR) light;
- wherein the illumination source comprises a plurality of near-infrared (NIR) light emitting diodes;
- wherein, with the interior rearview mirror assembly attached at the in-cabin side of the front windshield of the equipped vehicle, the driver monitoring camera accommodated within the movable head of the interior rearview mirror assembly views at least the head of the driver of the equipped vehicle;
- an image processor operable to process image data captured by the CMOS imaging array sensor of the driver monitoring camera;
- wherein the image processor operable to process image data captured by the driver monitoring camera is accommodated within the movable head of the interior rearview mirror assembly;
- wherein near-infrared (NIR) light emitted by the illumination source that is reflected off at least the head of the driver of the equipped vehicle is incident at the CMOS imaging array sensor of the driver monitoring camera;
- wherein emission of near-infrared (NIR) light by the illumination source is modulated on/off at an illumination source modulation rate;
- wherein the camera frame capture rate of the driver monitoring camera is bigger than the illumination source modulation rate of near-infrared (NIR) light emitted by the illumination source;
- wherein (i) frames of image data are captured by the driver monitoring camera and are processed at the image processor while the illumination source is on and is emitting near-infrared (NIR) light that illuminates at least the head of the driver of the equipped vehicle and (ii) frames of image data are captured by the driver monitoring camera and are processed at the image processor while the illumination source is off and is not emitting near-infrared (NIR) light to illuminate at least the head of the driver of the equipped vehicle; and
- wherein, via processing of captured image data at the image processor, attentiveness of the driver of the equipped vehicle is determined.

68. The vehicular driver monitoring system of claim 67, wherein the illumination source modulation rate is 30 times per second.

69. The vehicular driver monitoring system of claim 68, wherein the illumination source, when electrically activated, emits near-infrared (NIR) light having wavelength of 940 nm.

70. The vehicular driver monitoring system of claim 67, wherein, via processing of captured image data at the image processor, the eyes of the driver of the equipped vehicle are tracked.

71. The vehicular driver monitoring system of claim 67, wherein, via processing of captured image data at the image processor, focal distance of gaze by the driver of the equipped vehicle is determined.

72. The vehicular driver monitoring system of claim 67, wherein, via processing of captured image data at the image processor, where the face of the driver of the equipped vehicle is directed is tracked.

73. The vehicular driver monitoring system of claim 67, wherein, via processing of captured image data at the image processor, position of the head of the driver of the equipped vehicle is tracked.

74. The vehicular driver monitoring system of claim 73, wherein the driver monitoring camera views the pupils of the eyes of the driver of the equipped vehicle.

* * * * *